United States Patent
Owens

(10) Patent No.: US 9,387,803 B2
(45) Date of Patent: Jul. 12, 2016

(54) VEHICLE BACK-UP ASSIST SYSTEM

(71) Applicant: George Owens, Knob Noster, MO (US)

(72) Inventor: George Owens, Knob Noster, MO (US)

( * ) Notice: Subject to any disclaimer, the term of this patent is extended or adjusted under 35 U.S.C. 154(b) by 0 days.

(21) Appl. No.: 14/080,619

(22) Filed: Nov. 14, 2013

(65) Prior Publication Data

US 2014/0132403 A1 May 15, 2014

Related U.S. Application Data

(60) Provisional application No. 61/726,330, filed on Nov. 14, 2012.

(51) Int. Cl.
*B60Q 1/48* (2006.01)
*B60Q 7/00* (2006.01)

(52) U.S. Cl.
CPC .......................................... *B60Q 7/00* (2013.01)

(58) Field of Classification Search
CPC .......... E04H 6/426; G08G 1/16; B60Q 9/007; B60Q 9/008
USPC ...................... 340/435–438, 463, 473, 932.2; 116/28 R; 40/541, 553, 603
See application file for complete search history.

(56) References Cited

U.S. PATENT DOCUMENTS

| | | | |
|---|---|---|---|
| 3,668,626 A * | 6/1972 | Follett | 340/932.2 |
| 4,218,157 A * | 8/1980 | Moxness | 404/6 |
| 4,341,488 A * | 7/1982 | Ryan | 404/10 |
| 4,641,994 A * | 2/1987 | Hankison | 404/6 |
| 4,852,822 A * | 8/1989 | Brady | 242/405.3 |
| 5,177,479 A * | 1/1993 | Cotton | 340/932.2 |
| 6,053,657 A * | 4/2000 | Signorelli | 404/6 |
| 6,161,497 A * | 12/2000 | Sallee | 116/28 R |
| 6,850,172 B2 * | 2/2005 | Becka | G08B 17/10 180/274 |
| 7,049,980 B1 * | 5/2006 | Chemelewski | B60Q 9/004 340/556 |
| 7,287,793 B2 * | 10/2007 | Hamilton | B60P 3/36 116/28 A |
| 7,322,625 B2 * | 1/2008 | Hamilton | B60P 3/36 116/28 A |
| 8,466,808 B2 * | 6/2013 | Ghatak | E04H 6/426 340/425.5 |
| 8,610,598 B2 * | 12/2013 | Hider | B60Q 1/484 116/28 R |
| 2007/0126600 A1 * | 6/2007 | Huang | 340/908 |
| 2007/0298913 A1 * | 12/2007 | Winn et al. | 473/490 |
| 2010/0251957 A1 * | 10/2010 | Beattie | 116/63 P |
| 2011/0316720 A1 * | 12/2011 | Ghatak | 340/932.2 |

* cited by examiner

*Primary Examiner* — Eric M Blount
(74) *Attorney, Agent, or Firm* — Hovey Williams LLP

(57) ABSTRACT

A vehicle back-up assist system that can be set up by the vehicle driver or a spotter and provides a unique visual aid to assist with safely and efficient unloading, loading, or parking a vehicle without requiring assistance from another person. The back-up assist system includes a pair of differently colored portable markers. The markers can be placed near a target location toward which the vehicle is backing. The markers can be positioned for alignment with opposite sides of the vehicle during backing. The markers can be illuminated for better visibility and can include advance features, such as onboard measuring devices and/or lasers, to assist in proper placement of the markers and to provide enhance backing guidance to the driver.

22 Claims, 3 Drawing Sheets

VEHICLE BACK-UP ASSIST SYSTEM

CROSS-REFERENCE TO RELATED APPLICATIONS

This application claims benefit under 35 U.S.C. §119(e) based on U.S. Provisional Application No. 61/726,330 filed on Nov. 14, 2012, the entire disclosure of which is incorporated herein by reference.

BACKGROUND

1. Field of the Invention

The present invention relates generally to the field of vehicle safety. More particularly, the invention concerns a system for safely and efficiently assisting a driver with backing a vehicle to a desired location.

2. Prior Art

Safety of personnel and equipment is the main priority on any job site. When safety standards are compromised, accidents involving equipment can result in injury to personnel. Human assistance for backing a vehicle (e.g., a tractor trailer) to load or unload is often challenging because the spotter may become distracted, may be moving around, or may be difficult for the driver to see. Often there is not a clear understanding between the driver and the spotter as to where the vehicle needs to go. In some instances, drivers may be in situations where there is no spotter available to assist them. Thus, there exists a need for a system to assist drivers, especially drivers of large trucks, with backing to unload, load, or park.

SUMMARY OF THE INVENTION

The present invention is a portable vehicle back-up assist system that can be set up by a vehicle driver or a spotter. The system provides a unique visual aid to unload, load, or park vehicles without requiring assistance from another person. The back-up assist system can include a pair of portable markers, each having a different color. The portable markers can include a base and an upright member. The base is configured to engage the ground, while the upright member is coupled to and extends upwardly from said base.

In certain embodiments, one of the portable markers is red and the other is green. In addition, each of the portable markers can include a light source for illuminating the upright member.

In certain embodiments, the backup-assist system can include a guidance system for assisting with backing up the vehicle. The guidance system can include lights for guiding the vehicle and/or sensors for detecting the location of the vehicle relative to the markers.

The back-up assist system can also include a marker spacing system coupled to one or both of the portable markers. The marker spacing system can be used to ensure proper spacing between the markers and can include an elongated flexible measuring member (e.g., a cord or measuring tape) coupled to one of the portable markers.

To operate the back-up assist system, the portable markers are first positioned manually near a target location. This manual positioning of the markers can be done by a spotter or by the driver of the vehicle. The driver of the vehicle then backs up the vehicle towards the portable markers, while maintaining substantial alignment of the driver's side of said vehicle with one of said portable markers and maintaining substantial alignment of the passenger's side of said vehicle with the other portable marker.

During positioning of the markers, care can be taken to consistently use one color of marker for the driver's side and another color of marker for the passenger side. For example, when the markers are red and green, the red marker can consistently be used for alignment of the driver's side of the vehicle and the green marker can consistently be used for alignment of the passenger's side of the vehicle.

The back-up assist system can provide a number of benefits including, for example, (1) eliminating the need for a spotter, (2) allowing the spotter to stay outside the danger zone, (3) providing a visual indication to other drivers/employees that backing is taking place, (4) enhancing safety in conditions of reduced visibility, (5) providing immediate feedback on the location of the vehicle relative to the markers, and (6) offering a system that is easy to set up and transport.

The inventive system can be used in conjunction with a variety of types of vehicles including, for example, straight trucks, semi-trailers, delivery trucks, dump trucks, tow trucks, box trucks, rental/moving trucks, buses, horse trailers, recreational vehicles, farm machinery, boat trailers, and construction equipment.

Locations at which the inventive system can be employed include, for example, loading docks, warehouses, construction sites, storage facilities, campsites for RV camping, other job sites involving heavy equipment, and other locations where backing of a large vehicle would occur.

BRIEF DESCRIPTION OF THE DRAWINGS

Embodiments of the present invention are described herein with reference to the appended drawings, where.

DETAILED DESCRIPTION

Figure 1:
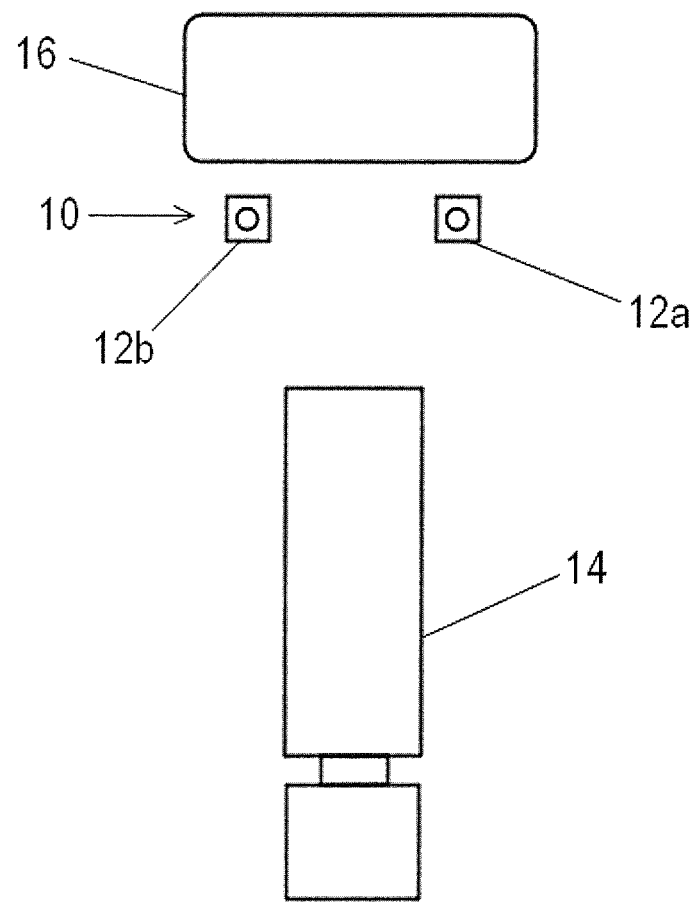
FIG. 1 is an overhead environmental view showing a vehicle that is backing toward a target location with the assistance of a back-up assist system.

In FIG. 1, a back-up assist system 10 is illustrated as including a first portable marker 12a and a second portable marker 12b. The back-up assist system can be used to help guide a vehicle 14 that is backing toward a target location 16. As used herein, the term "vehicle" shall include not only self-propelled vehicles, but also apparatuses that can be permanently or temporarily attached to self-propelled vehicles (e.g., trailers, campers, etc.).

Figure 2A:
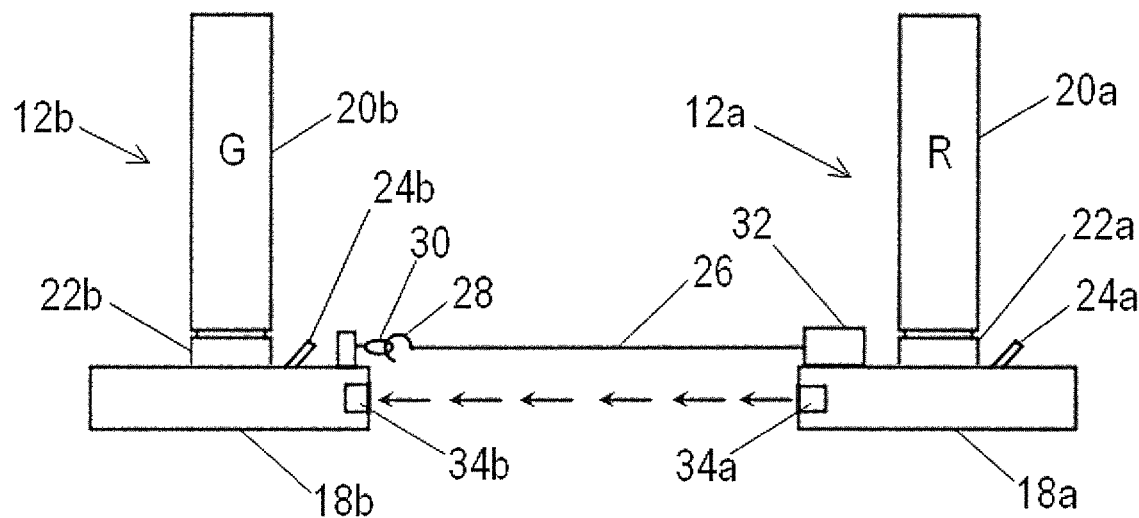
FIG. 2a is a plan view of two portable markers included in the back-up assist system.
Figure 2B:
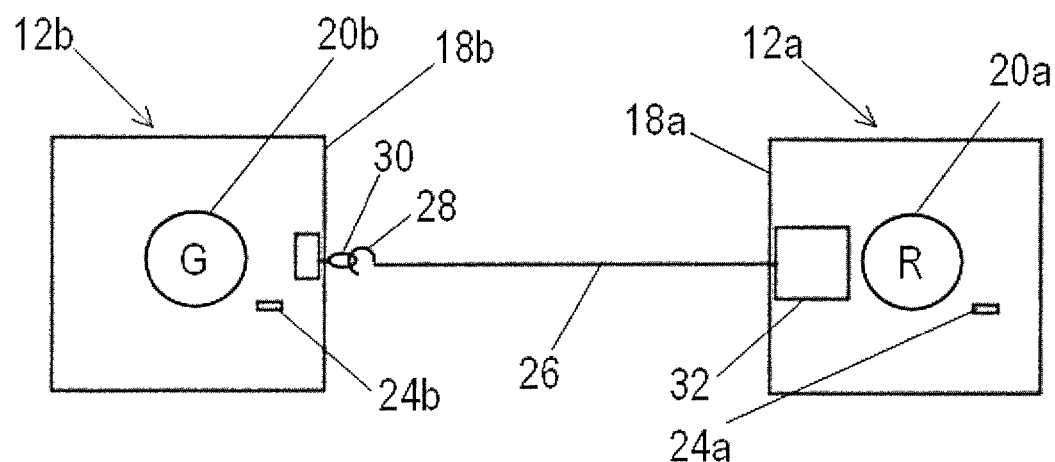
FIG. 2b is a top view of two portable markers included in the back-up assist system.

As shown in FIGS. 2a and 2b, each marker 12a,b can include a base 18a,b and an upright member 20a,b. Each base 18a,b can include a bottom face that is configured to engage a substantially horizontal surface, such as the ground or a loading dock. Each upright member 20a,b can be coupled to and extend upwardly from a respective base 18a,b. In certain embodiments, each base 18a,b is equipped with an internally-threaded collar 22a,b and the bottom of each upright member 20a,b can include a corresponding externally-threaded section, thereby allowing each upright section 20a,b to be threadably coupled to the respective base 18a,b.

In certain embodiments, each marker 12a,b is equipped with a light source capable of illuminating all or part of the upright members 20a,b. When the markers 12a,b are equipped with a light source, the markers 12a,b may also include a switch 24a,b for activating and deactivating illumination of the markers 12a,b.

The upright members 20a,b can be differently colored to assist the driver with aligning the vehicle 14 with the proper marker 12a,b. In certain embodiments, the upright member 20a of the first portable marker 12a is red and the upright member 20b of the second portable marker is green. It is internationally recognized in directing traffic that red indicates the left/port/driver's side and green indicates the right/starboard/passenger's side. Using these standard red and green colors can help ensure that the driver properly aligns the appropriate side of the vehicle 14 with the appropriate markers 12a,b.

In the illustrated embodiment, the back-up assist system 10 includes a marker spacing system that is use to ensure proper spacing between the markers 12a,b. A marker spacing system is used to check the distance between the markers 12a,b to ensure that the vehicle 14 will fit between them.

As shown in FIGS. 2a and 2b, the marker spacing system can include a flexible, elongated measuring member 26, a first attachment member 28, a second attachment member 30, and a retention housing 32. The measuring member 26 can be any flexible member of suitable strength and durability such as, for example, a nylon rope or cord. The retention housing 32 can be coupled to the first marker 12a and can be used to receive and store the measuring member 26 and first attachment member 28 when not in use. The measuring member 26 can be shifted between a retracted position, where the measuring member 26 is substantially received in the retention housing 32, and an extended position, where the distal end of the extension member 26 is attached to the second marker 12b via the first and second attachment members 28,30.

In certain embodiments, the retention housing 32 can be configured to automatically shift the measuring member 26 from the extended position to the retracted position. However, shifting of the measuring member 26 from the retracted position to the extended position requires manual pulling of the measuring member 26 out the retention housing 32. Automatic retraction of the measuring member 26 helps eliminate a tripping hazard after the markers 12a,b have been positioned and before backing the vehicle 14.

The first and second attachment members 28,30 can be used to releasably secure a distal end of the measuring member 26 to the second marker 12b when the measuring member 26 is in the extended position. In one embodiment of the invention, the first attachment member 28 is a hook and the second attachment member 30 is an eyelet.

The measuring member 26 is preferably slightly longer than the maximum width of the vehicle 14 being guided by the back-up assist system 10. It is preferred for the measuring member 26 to have a length that is not less than the the maximum width of the vehicle 14, but that is not more than 1.25 times the maximum width of the vehicle 14. More specifically, the length of the measuring member 26 can be in the range of 5 to 15 feet, 7 to 12 feet, or 8 to 10 feet. In certain embodiments, the length of the measuring member 26 can be about 8.5 feet, thereby allowing the markers 12a,b to be placed slightly outside the width of a standard tractor trailer, which is 8 feet wide. In addition, measuring member 26 can be marked in the middle for centering the vehicle 14 as needed.

In certain embodiments, the first marker 12a and/or the second marker 12b can be equipped with one or more guidance mechanisms 34a,b. The guidance mechanisms can be used for helping to align the vehicle 14 during backing and/or for helping the driver to know when the vehicle 14 has reached the target location 16. Although the guidance mechanisms 34a,b are depicted in the drawings as being coupled to the bases 18a,b, it should be understood that the guidance mechanisms 34a,b can be attached anywhere along the height of the upright members 20a,b as well.

In certain embodiments, the guidance mechanisms 34a,b can include at least one laser that directs a beam of laser light on the ground in a direction that is perpendicular to a straight line extending between the markers 12a,b. These lasers can act as temporary guide lines to help the driver maintain alignment of the vehicle 14 with the target location 16 during backing. Further, the laser guide lines can provide a highly visible alignment aid at night.

Additionally, or alternatively, the guidance mechanisms 34a,b can be used as a distance indicating system that provides real-time information about the location of the vehicle 14 relative to one or both of the markers 12a,b. Such a distance indicating system can be configured to provide an alert signal on at least one of the markers 12a,b when the vehicle 14 is at or near the portable makers 12a,b.

In certain embodiments, one or both of the guidance mechanisms 34a,b are sensors that sense the position of the vehicle 14. These sensors can be motion sensors and/or distance sensors. In one embodiment, the sensor can be a laser that senses when the laser beam is interrupted by an abject, such as the vehicle 14. In other embodiments, the first guidance mechanism 34a can be a signal transmitter and the second guidance mechanism 34b can be a signal receiver. The signal transmitter and receiver can cooperate to provide an alert when the signal transmitted by one of the markers and received by the other marker is interrupted. The alert signal activated by the distance indicating system can include causing an alert light on at least one of the markers 12a,b to be turned on and/or to blink. The alert light can be the same light or lights used to illuminate the upright members 20a and/or 20b or the alert light can be a separate light (not shown). Alternatively, or additionally, the alert signal can be an audible alert.

FIG. 2b shows that the bases 18a,b of the markers 12a,b can be generally square in shape, while the upright members 20a,b, can be generally cylindrical in shape. Alternatively, the base 18a,b can be circular and the upright member 20a,b can have a triangular, square, or other polygonal shape.

The upright members 20a,b should be sufficiently tall to be highly visible by the driver of the vehicle 14. For example the upright members 20a,b can have a height in the range of 6 inches to 6 feet, 1 to 5 feet, or 2 to 4 foot. When the markers 12a,b are equipped with lights that illuminate the upright members 20a,b, the upright members 20a,b can be made of semi-transparent/translucent material. The material may be colored itself or it may be covered with a colored, translucent film.

For enhance visibility, it is preferred for a large portion of the total outer surface area of the upright members 20a,b to be illuminated and for the total outer surface area of the upright members 20a,b to relatively large. For example, the upright members 20a,b can have a total outer surface area of at least 0.5, 1, 2, or 3 square feet. Further, at least 50, 75, or 90 percent of the total outer surface area of the upright members 20a,b can be illuminated.

Figure 3A:
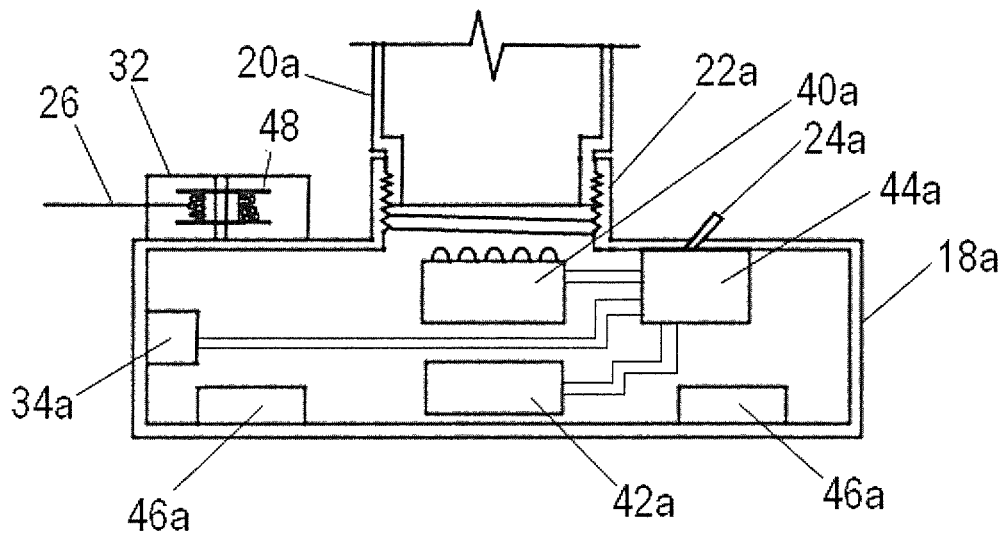
FIG. 3a is an enlarged simplified sectional view of the base of a first one of the portable markers depicted in FIGS. 2a and 2b.

FIG. 3a provides a simplified cross-sectional view of the base 18a of the first marker 12a. As shown in FIG. 3a, a light source 40a can be received in the base 18a and can be operable to shine light upwardly into the inside of the upright member 20a, thereby causing illumination of the upright member 20. The light source can include a plurality of LED lights for enhanced brightness and efficiency. One or more batteries 42a may also be received in the base 18a and used to power the light source 40a, as well as any other electronic components associated with the first marker 12a.

In certain embodiments, an electronic controller 44a is received in the base 18a. The electronic controller 44a can be electronically coupled to the battery 42a, the light source 40a, the guidance mechanism 34a, and/or the switch 24a. The controller 44a can receive signals from the guidance mechanism 34a and then control the light source 40a based on the signal from the guidance mechanism 34a and, optionally, the position of the switch 24a.

In one embodiment, the switch 24a can be a simple "on/off" switch. In other embodiments, the switch 24a can be used to choose between a variety of different modes of operation. For example, the switch can have an "off" mode, a "daytime" mode, and a "nighttime" mode. In the off "mode," no power is provided to the light source 40. In the "daytime" mode, the light source is not illuminated until an alert signal is receive from the guidance mechanism 34a indicating the that vehicle 14 is at or near the markers 12a,b. In the "nighttime" mode, the light source 40a is illuminated until the guidance mechanism 34a indicates that the vehicle 14 is at or near the markers 12a,b, at which time the controller 44a causes the light source 40a to blink on and off as a warning.

Many other modes of operation and warning/alert methods can be used. For example, the markers 12a,b can be equipped with speakers (not shown) to provide and audible alert. When the markers 12a,b are equipped with speakers, the switch 24a can include an "audible on" mode, where the speakers are used to provide an audible warning, and an "audible off" mode, where the speakers are not used to provided an audible warning.

As shown in FIG. 3a, a perimeter weight 46a can be received in the base 18a. The perimeter weight 46a functions to add weight near the perimeter of the base 18a and to lower the center of gravity of the overall marker 12a, thereby reducing the marker's 12a susceptibility to tipping. It is preferred for the center of gravity of the marker 12a to be located in the lower 40 percent, 30 percent, 25 percent, or 20 percent of the overall height of the marker 12a.

FIG. 3a also shows that the retention housing 32 can include a reel 48 onto which the measuring member 26 is wound when the measuring member 26 is in the retracted position. In one embodiment, the reel 48 is spring loaded, so the reel 48 automatically retracts the measuring member 26 back into the retention housing 32.

Figure 3B:
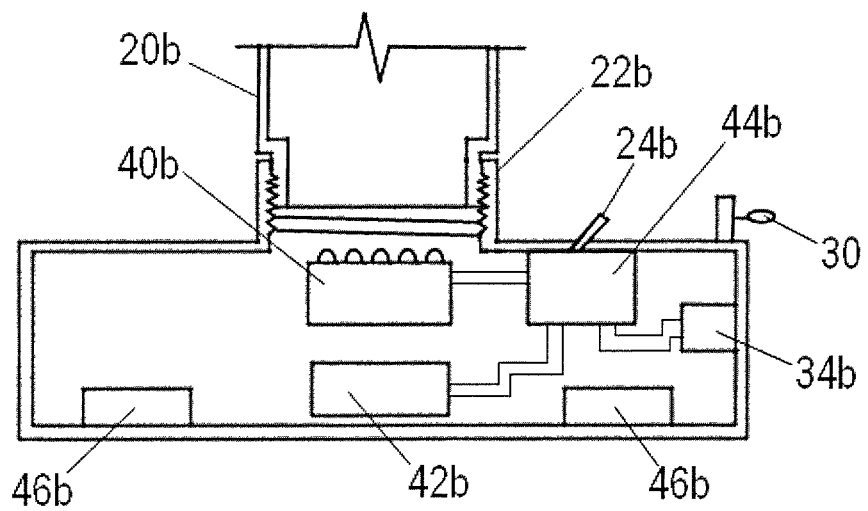
FIG. 3b is an enlarged simplified sectional view of the base of a second one of the portable markers depicted in FIGS. 2a and 2b.

FIG. 3b shows that the base 20b of the second marker 12b can include many of the same components as the base 20a of the first marker 12a. However, the base 20b of the second marker 12b is provided with the second attachment mechanism 30 to which the first attachment mechanism 28 of the measuring member 26 can be releasably coupled.

Referring again to FIGS. 1, 2a, and 2b, in operation, the backing-up assist system 10 can be employed by first manually positioning the portable markers 12a,b near the target location 16. This manual positioning of the markers 12a,b can be done by a spotter or by the driver of the vehicle. The positioning can include using the measuring member 26 to ensure proper spacing between the markers 12a,b. If the markers are equipped with light sources 40a,b, the light sources 40a,b can be turned on before backing of the vehicle 14 is initiated.

During positioning of the markers 12a,b, care can be taken to consistently use one color of marker for the driver's side and another color of marker for the passenger side. For example, when the markers 12a,b are red and green, the red marker can consistently be used for alignment of the driver's side of the vehicle 14 and the green marker can consistently be used for alignment of the passenger's side of the vehicle 14.

Next, the driver of the vehicle 14 backs up the vehicle 14 towards the markers 12a,b, while maintaining substantial alignment of the driver's side of the vehicle 14 with the first portable marker 12a and maintaining substantial alignment of the passenger's side of the vehicle 12b with the second portable marker 12b.

When the markers 12a,b are equipped with a distance indicating system, one or both of the markers 12a,b automatically provides an alert signal when the vehicle 14 reaches the desired location. After parking the vehicle 14, the markers 12a,b can be manually moved to another location or place on/in the vehicle 14 for reuse with the same vehicle 14 at a different location.

That which is claimed is:

1. A vehicle back-up assist system comprising:
   a first portable marker of a first color;
   a second portable marker of a second color that is different from said first color,
   wherein each of said portable markers comprises—
   a base, an upright member, and a guidance mechanism,
   wherein said base presents a bottom face configured to engage a substantially horizontal surface,
   wherein said upright member is coupled to and extends upwardly from said base,
   wherein said upright member has a height of at least 6 inches and not more than 6 feet,
   wherein said guidance mechanism is attached to at least one of said base and said upright member, and is configured to direct a beam of light on said substantially horizontal surface as a vehicle alignment aid,
   wherein said guidance mechanism is configured to direct said beam of light in a direction that is substantially perpendicular to a straight line extending between said first and second markers; and
   a motion sensor coupled to at least one of said portable markers and configured to provide real-time information about a position of the vehicle.

2. The system of claim 1, wherein said first portable marker is red and said second portable marker is green.

3. The system of claim 1, wherein each of said portable markers comprises a light source for illuminating at least a portion of said upright member.

4. The system of claim 3, wherein said light source is internal to said portable marker and said upright member is formed of or coated with a colored translucent material.

5. The system of claim 3, wherein said upright member is threadably coupled to said base so as to provide access to said light source.

6. The system of claim 4, wherein said light source is coupled to said base and directs light upwardly into said upright member.

7. The system of claim 6, wherein said light source comprises a plurality of LED lights.

8. The system of claim 3, wherein at least 1 square foot of the outer surface area of said upright member is illuminated by said light source.

9. The system of claim 3, wherein said upright member has a total outer surface area of at least 1 square foot, wherein at least 50 percent of the total outer surface area of said upright member is illuminated by said light source.

10. The system of claim 1, wherein the center of gravity of each of said portable markers is located in the bottom 30 percent of the portable marker.

11. The system of claim 1, further comprising a distance indicator system coupled to one or both of said portable markers and configured to provide real-time information about the location of the vehicle relative to one or both of said portable markers.

12. The system of claim 11, wherein said distance indicator system is configured to provide an alert signal on at least one of said portable markers when the vehicle is at or near said portable makers.

13. The system of claim 12, wherein said distance indicator system comprises a laser sensor.

14. The system of claim 12, wherein said distance indicator system comprises a signal transmitter on one of said markers and a signal receiver on another of said markers, wherein said distance indicator system is configured to provide said alert when the signal transmitted by one of said markers and received by another of said markers is interrupted.

15. The system of claim 14, wherein at least one of said portable markers comprises an alert light, wherein said alert signal includes turning on and/or blinking said alert light.

16. The system of claim 1, further comprising a marker spacing system coupled to one or both of said markers, wherein said marker spacing system comprises an elongated flexible measuring member coupled to one of said markers.

17. The system of claim 16, wherein said marker spacing system comprises a retention housing, wherein said measuring member is shiftable between a retracted position where said measuring member is substantially received in said retention housing and an extended position where said measuring member extends outwardly from said retention housing.

18. The system of claim 1, wherein said guidance mechanism is a laser configured to direct a beam of laser light on said substantially horizontal surface in a direction that is perpendicular to a straight line extending between said first portable marker and said second portable marker.

19. An assisted method of backing up a vehicle, said method comprising:
 (a) manually positioning a pair of portable markers near a target location, wherein said portable markers are differently colored;
 (b) directing a beam of light produced by at least one of said markers in a direction that is substantially perpendicular to a straight line extending between said markers;
 (c) backing up a vehicle towards said portable markers;
 (d) during said backing up of step (c), maintaining substantial alignment of a driver's side of said vehicle with one of said portable markers and maintaining substantial alignment of a passenger's side of said vehicle with the other of said portable markers; and
 (e) stopping said vehicle when the back of said vehicle is at or near said portable markers, wherein said stopping is in response to an alert signal generated by at least one of said portable markers, wherein said alert signal is generated when a signal transmitted by one of said portable markers is interrupted by a portion of said vehicle.

20. The method of claim 19, further comprising turning on at least one light associated with each of said portable markers to thereby illuminate said portable markers.

21. The method of claim 19, wherein said positioning of step (a) includes using a flexible elongated measuring device coupled to one of said portable markers to measure out a desired distance between said portable markers.

22. The method of claim 21, wherein said desired distance is not less than the maximum width of said vehicle and not more than 1.25 times the maximum width of said vehicle.

* * * * *